(12) United States Patent
Chan

(10) Patent No.: US 7,889,080 B2
(45) Date of Patent: Feb. 15, 2011

(54) CONTROL SYSTEM AND METHOD THEREOF

(75) Inventor: Yao-Chen Chan, Taipei (TW)

(73) Assignee: Mitac International Corp., Taoyuan (TW)

( * ) Notice: Subject to any disclaimer, the term of this patent is extended or adjusted under 35 U.S.C. 154(b) by 1056 days.

(21) Appl. No.: 11/627,551

(22) Filed: Jan. 26, 2007

(65) Prior Publication Data

US 2007/0171067 A1 Jul. 26, 2007

(30) Foreign Application Priority Data

Jan. 25, 2006 (TW) .............................. 95102911 A

(51) Int. Cl.
*H04Q 5/22* (2006.01)

(52) U.S. Cl. ................................. 340/572.1; 340/10.41

(58) Field of Classification Search .............. 340/572.1, 340/10.41
See application file for complete search history.

(56) References Cited

U.S. PATENT DOCUMENTS

| | | | | | |
|---|---|---|---|---|---|
| 5,790,945 | A * | 8/1998 | Erickson | ..................... | 455/325 |
| 5,790,946 | A * | 8/1998 | Rotzoll | ..................... | 455/343.1 |
| 5,842,118 | A * | 11/1998 | Wood, Jr. | ..................... | 455/101 |
| 6,078,251 | A * | 6/2000 | Landt et al. | ............... | 340/10.41 |
| 6,320,535 | B1 * | 11/2001 | Hillman et al. | ......... | 342/357.31 |
| 6,593,845 | B1 * | 7/2003 | Friedman et al. | ......... | 340/10.33 |
| 6,721,289 | B1 * | 4/2004 | O'Toole et al. | ............. | 370/311 |
| 6,721,572 | B1 * | 4/2004 | Smith et al. | ............... | 455/456.1 |
| 6,735,183 | B2 * | 5/2004 | O'Toole et al. | ............. | 370/311 |
| 6,735,630 | B1 * | 5/2004 | Gelvin et al. | ................ | 709/224 |
| 6,760,578 | B2 * | 7/2004 | Rotzoll | ..................... | 455/343.2 |
| 6,985,753 | B2 * | 1/2006 | Rodriguez et al. | ........ | 455/550.1 |
| 7,019,617 | B2 * | 3/2006 | Pratt et al. | .................. | 340/10.1 |
| 7,023,341 | B2 * | 4/2006 | Stilp | ........................ | 340/572.1 |
| 7,057,512 | B2 * | 6/2006 | Stilp | ........................ | 340/572.1 |
| 7,061,366 | B2 * | 6/2006 | Bell et al. | ..................... | 340/5.2 |
| 7,079,043 | B2 * | 7/2006 | O'Toole et al. | ......... | 340/825.36 |
| 7,119,664 | B2 * | 10/2006 | Roesner | ................... | 340/10.33 |
| 7,142,838 | B2 * | 11/2006 | Rotzoll | ..................... | 455/343.2 |
| 7,215,976 | B2 * | 5/2007 | Brideglall | ................. | 455/552.1 |
| 7,280,045 | B2 * | 10/2007 | Saarisalo et al. | .......... | 340/572.7 |
| 7,324,015 | B1 * | 1/2008 | Allen et al. | .................. | 340/933 |
| 7,429,919 | B2 * | 9/2008 | Silic et al. | ................. | 340/539.1 |
| 7,554,452 | B2 * | 6/2009 | Cole | ........................ | 340/573.1 |
| 7,576,650 | B1 * | 8/2009 | Ghaffari | ................... | 340/572.1 |
| 7,576,657 | B2 * | 8/2009 | Duron et al. | .............. | 340/572.7 |
| 7,577,441 | B2 * | 8/2009 | Nonoyama | ................ | 455/456.1 |
| 7,577,516 | B2 * | 8/2009 | Dobeck et al. | .............. | 701/200 |

(Continued)

*Primary Examiner*—Thomas G Black
*Assistant Examiner*—Wae Louie
(74) *Attorney, Agent, or Firm*—Wang Law Firm; Li K. Wang

(57) ABSTRACT

This invention discloses a control system and method thereof that is applied to a navigation apparatus. The system includes an apparatus body, a tag, a reader, a recognition module, and a processor. The apparatus body is mounted in the navigation apparatus to provide a navigation function. The tag is mounted on an object to provide a recognition data. The reader is used to detect and read the recognition data. The recognition module is used to compare the recognition data with a predetermined recognition data in order to generate a trigger signal. The processor is used to receive the trigger signal and then drives the apparatus body to perform a wakeup mode. If the processor does not receive the trigger signal in a determined period, the processor will drive the apparatus body to perform a sleep mode.

28 Claims, 5 Drawing Sheets

U.S. PATENT DOCUMENTS 7,605,701 B2 * 10/2009 Lee .......................... 340/572.1
7,667,646 B2 * 2/2010 Kalliola et al. .............. 342/417
7,714,723 B2 * 5/2010 Fowler et al. ............ 340/572.1

* cited by examiner

CONTROL SYSTEM AND METHOD THEREOF

FIELD OF THE INVENTION

The present invention generally relates to a control system, and more specifically relates to the control system that enables a satellite navigation apparatus to be automatically turned on or off.

BACKGROUND OF THE INVENTION

As science and technology advances, a global positioning system (GPS) originally designed for military purposes is opened to the public and commercial use now, and the American global positioning system includes 24 geostationary satellites operated in 6 orbits with an altitude of approximately 20,000 kilometers and revolving around the earth once every 12 hours so that each satellite can be assured to passes through a same point on the surface of the earth at the same time everyday so as to constitute virtual coordinates in the space.

Folks can possess and use a receiver to track all satellites of the global positioning system and immediately compute the coordinates of the location, the moving speed and time of the receiver. The principle of computing these data relies on that the coordinate of the location of any satellite in the space at any moment is taken as a known value when the satellite is in motion. The coordinate of the location of the receiver is taken as an unknown value. The time taken for sending a message from the satellite in the space to the receiver can be calculated by comparing the clock of the satellite with the clock within the receiver. The product of the time difference and the speed of the transmitted electric waves (which is generally set to the speed of light) can be used to compute the distance between the satellite in the space and a user's receiver. Therefore, a related equation can be derived from the trigonometric vector relations.

In general, the coordinates of the location of our receivers can be calculated by the aforementioned principle. A related equation will be obtained for every signal received from a satellite so that after the signals transmitted from three or more satellites are received, planar coordinates (longitude and latitude) can be further calculated. If the signals transmitted from four satellites are received, the altitude of the GPS can be found, and if the signals transmitted from five or more satellites are received, then the accuracy of the calculation will be improved.

As the GPS becomes an open system, people continue researches to enable a personal digital assistant (PDA) to be integrated with the GPS for different applications. However, traditional PDAs still require users to manually turn on or off the PDAs even though the GPS is combined, and then start the GPS for the navigation function after the PDA is turned on. Such procedure causes inconvenience to users and fails to provide a user-friendly man-machine interface.

Therefore, the inventor of the present invention based on years of experience in the related field from conducting research and experiments, invents a control system in accordance with the present invention in the hope of obtaining expected results and overcoming the shortcomings of the prior arts.

SUMMARY OF THE INVENTION

Therefore, it is a primary objective of the present invention to provide a control system applied to a satellite navigation apparatus of a personal digital assistant. Users can bring a tag of the system with them to a car, so that an apparatus body of the system will be turned on automatically and converted from a sleep mode into a wakeup mode for performing a navigation function. After users take the tag away from the car, the apparatus body will be turned off automatically and converted from the wakeup mode to the sleep mode. There is no need for users to press any button or give instructions to turn on or off the system, and thus the invention makes the satellite navigation apparatus more user-friendly.

To achieve the foregoing objective, a control system of the invention applied to a satellite navigation apparatus comprises an apparatus body, a tag, a reader, a recognition module, and a processor. The apparatus body is installed in the satellite navigation apparatus for providing a navigation function. The tag is installed on an object such as a key for providing a recognition data such as a recognition code. The reader is installed in the satellite navigation apparatus for detecting and reading the recognition data. The recognition module is installed in the satellite navigation apparatus for comparing the recognition data with a predetermined recognition data; if the recognition data matches the predetermined recognition data, then the recognition module will generate a trigger signal. The processor is installed in the satellite navigation apparatus for receiving the trigger signal to drive the apparatus body to perform a wakeup mode. If the processor does not receive a trigger signal in a predetermined period, then the processor will drive the apparatus body to enter a sleep mode. In addition, a light module, a sound module or a GPS module is turned off under the sleep mode; and a light module, a sound module, or a GPS module is turned on under the wakeup mode. If the GPS module is turned on, a satellite positioning will be performed or a navigation function will be executed.

The foregoing control method of the present invention is applied to a satellite navigation apparatus, wherein the satellite navigation apparatus includes an apparatus body and a processor, and the apparatus body provides a navigation function. The method comprises the steps of installing a tag on an object to generate a recognition data; installing a reader in the satellite navigation apparatus, and the reader is provided for detecting and reading the recognition data; installing a recognition module in the satellite navigation apparatus, and the recognition module is provided for comparing the recognition data with a predetermined recognition data; if the recognition data matches the predetermined recognition data, then the recognition module will generate a trigger signal; if the processor receives the trigger signal, then the processor will drive the apparatus body to perform a wakeup mode; if the processor does not receive the trigger signal in a predetermined period, then the processor will drive the apparatus body to enter a sleep mode, so as to achieve the effect of turning on or off the satellite navigation apparatus automatically.

To make it easier for our examiner to understand the objective of the invention, its innovative features and performance, a detailed description and technical characteristics of the present invention are described together with the drawings as follows.

DETAILED DESCRIPTION OF THE PREFERRED EMBODIMENTS

In the related figures of a control system according to a preferred embodiment of the present invention, the same elements are represented by the same numbers indicated in the figures.

Figure 1:
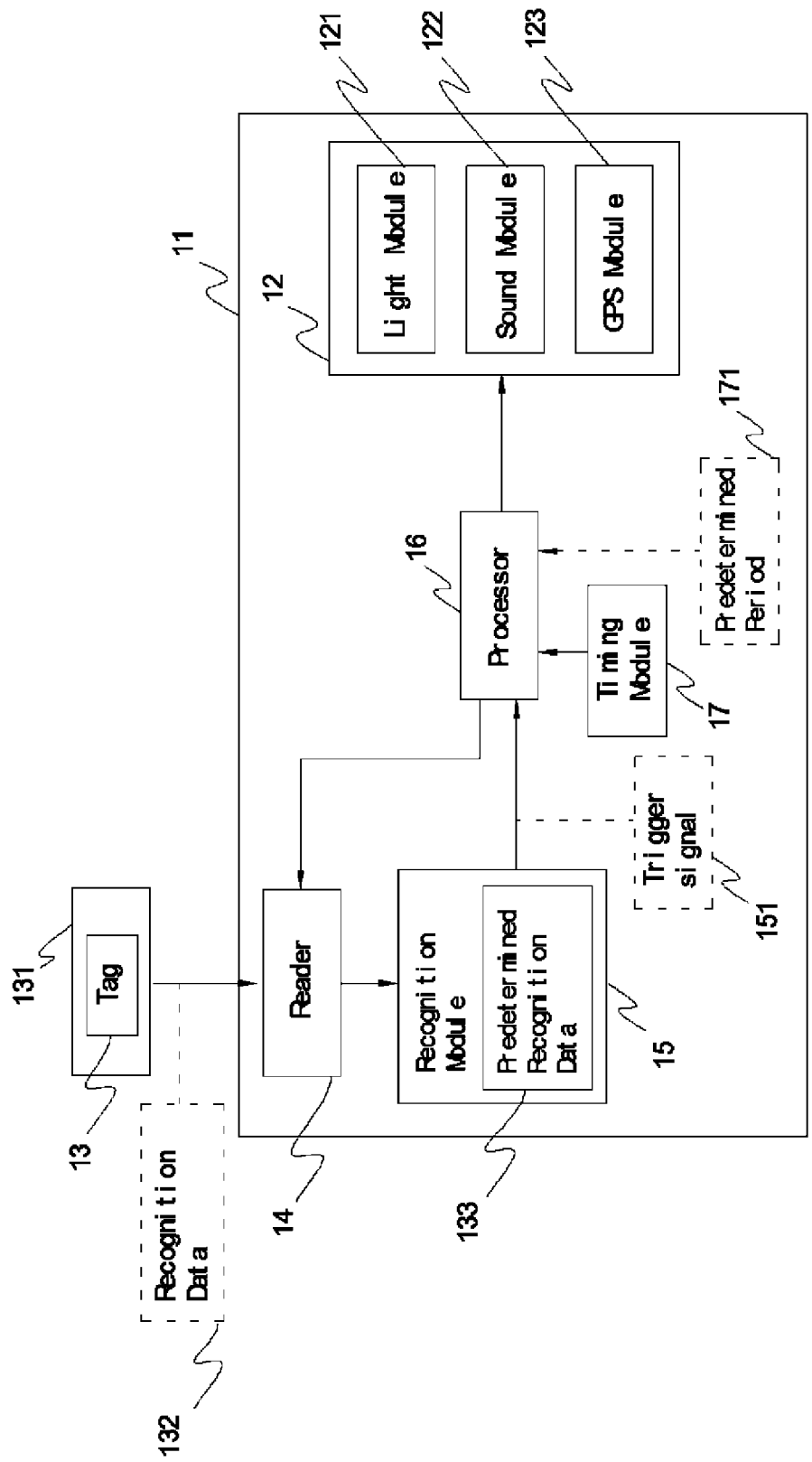
FIG. 1 is a schematic block diagram of a control system of the present invention.

Referring to FIG. 1 for the block diagram of a control system in accordance with the present invention, the control system is applied to a satellite navigation apparatus 11 of a personal digital assistant. In FIG. 1, the control system comprises an apparatus body 12, a tag 13, a reader 14, a recognition module 15, and a processor 16. The apparatus body 12 comprises a light module 121, a sound module 122, and a GPS module 123 installed in the satellite navigation apparatus 11 for providing a navigation function. The tag 13 is mounted on an object (such as a key) 131 for providing a recognition data 132 (such as an identification code). The reader 14 is installed in the satellite navigation apparatus 11 for detecting and reading the recognition data 132 of the tag 13. The recognition module 15 is installed in the satellite navigation apparatus 11 for comparing the recognition data 132 with a predetermined recognition data 133. If the recognition data 132 matches a predetermined recognition data 133, then the recognition module 15 will generate a trigger signal 151 and send the trigger signal 151 to the processor 16. After the processor 16 receives the trigger signal 151, the processor 16 will drive the apparatus body 12 to perform a normal wakeup mode. If the processor 16 does not receive the trigger signal 151 in a predetermined period 171, then the processor 16 will drive the apparatus body 12 to enter a sleep mode. The control system further comprises a timing module 17 for counting time. A light module 121, a sound module 122, and a GPS module 123 is turned on under the wakeup mode, and a light module 121, a sound module 122, and a GPS module 123 is turned off under the sleep mode. The predetermined period 171 can be set between 5~10 minutes, and such range is only set for a preferred embodiment of the invention only.

The foregoing tag 13 adopts a radio frequency identification (RFID) technology, and the so-called RFID technology refers to a contactless automatic identification technology that uses wireless radio frequency waves to identify objects and can be applied for the tag and the reader. The core element is the tag having a diameter less than 2 mm and including a wireless communication circuit and a memory for sending the required data to the reader through the wireless electric waves transmitted by a sensor within the distance from several centimeters to several meters and accomplishing a contactless data transmission by using the principle of passing radio frequency signals through a space coupling (alternating magnetic field or electromagnetic field).

Figure 2:
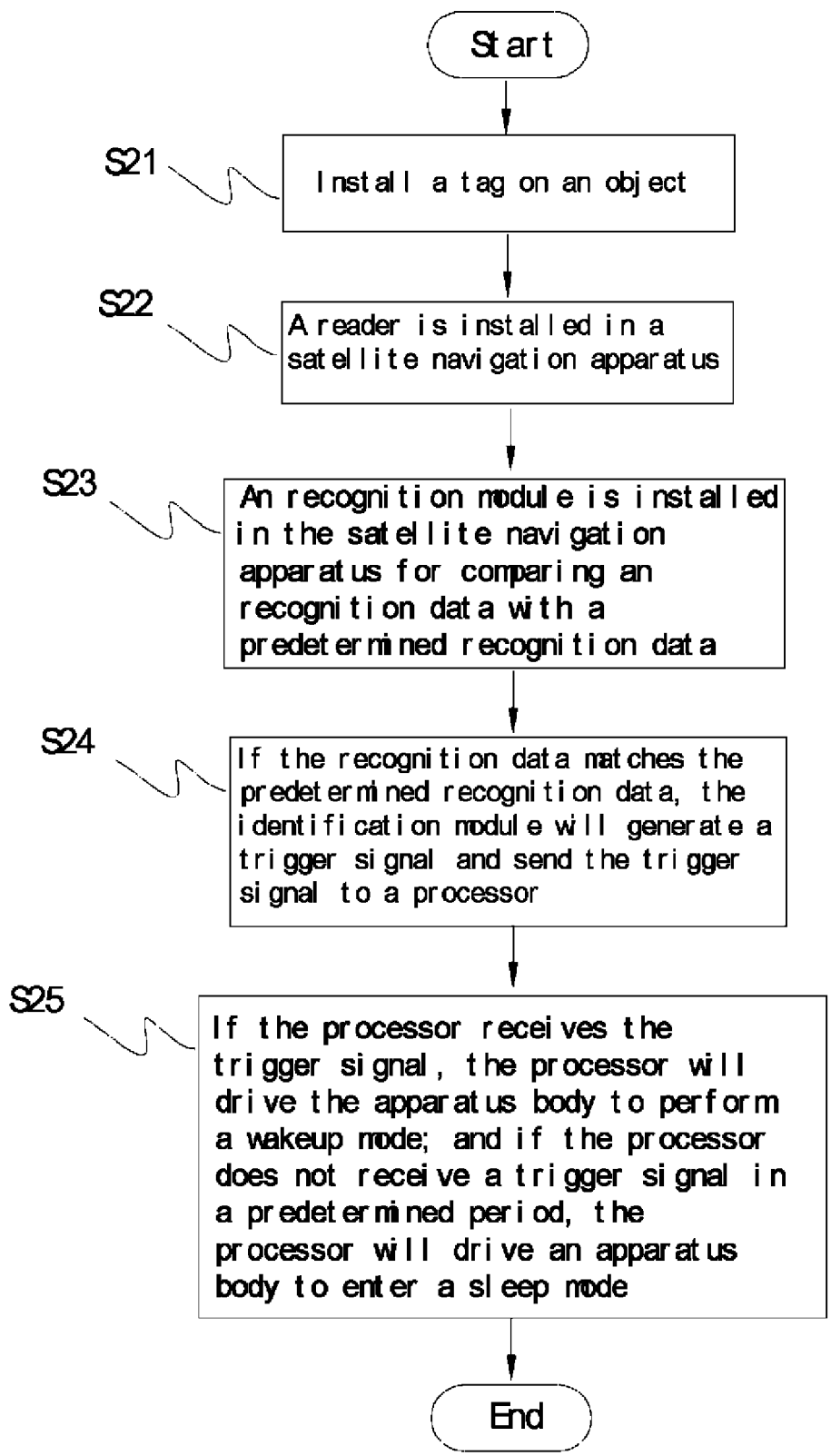
FIG. 2 is a flow chart of a control method of the present invention.

Referring to FIG. 2 for the flow chart of a control method of the present invention, the method is applied to a satellite navigation apparatus, and the satellite navigation apparatus includes an apparatus body and a processor, and the apparatus body provides a navigation function. The control method comprises the steps of: starting the process; installing a tag on an object to produce a recognition data (S21); installing a reader in a satellite navigation apparatus, and the reader is provided for detecting and reading the recognition data of the tag (S22); installing a recognition module in the satellite navigation apparatus, and the recognition module is provided for comparing the recognition data with a predetermined recognition data (S23); if the recognition data matches the predetermined recognition data, then the recognition module will generate a trigger signal and send the trigger signal to a processor (S24); if the processor receives the trigger signal, then the processor will perform a wakeup mode; if the processor does not receive the trigger signal in a predetermined period, then the processor will drive the apparatus body to enter a sleep mode (S25); and finally ending the whole process.

Figure 3:
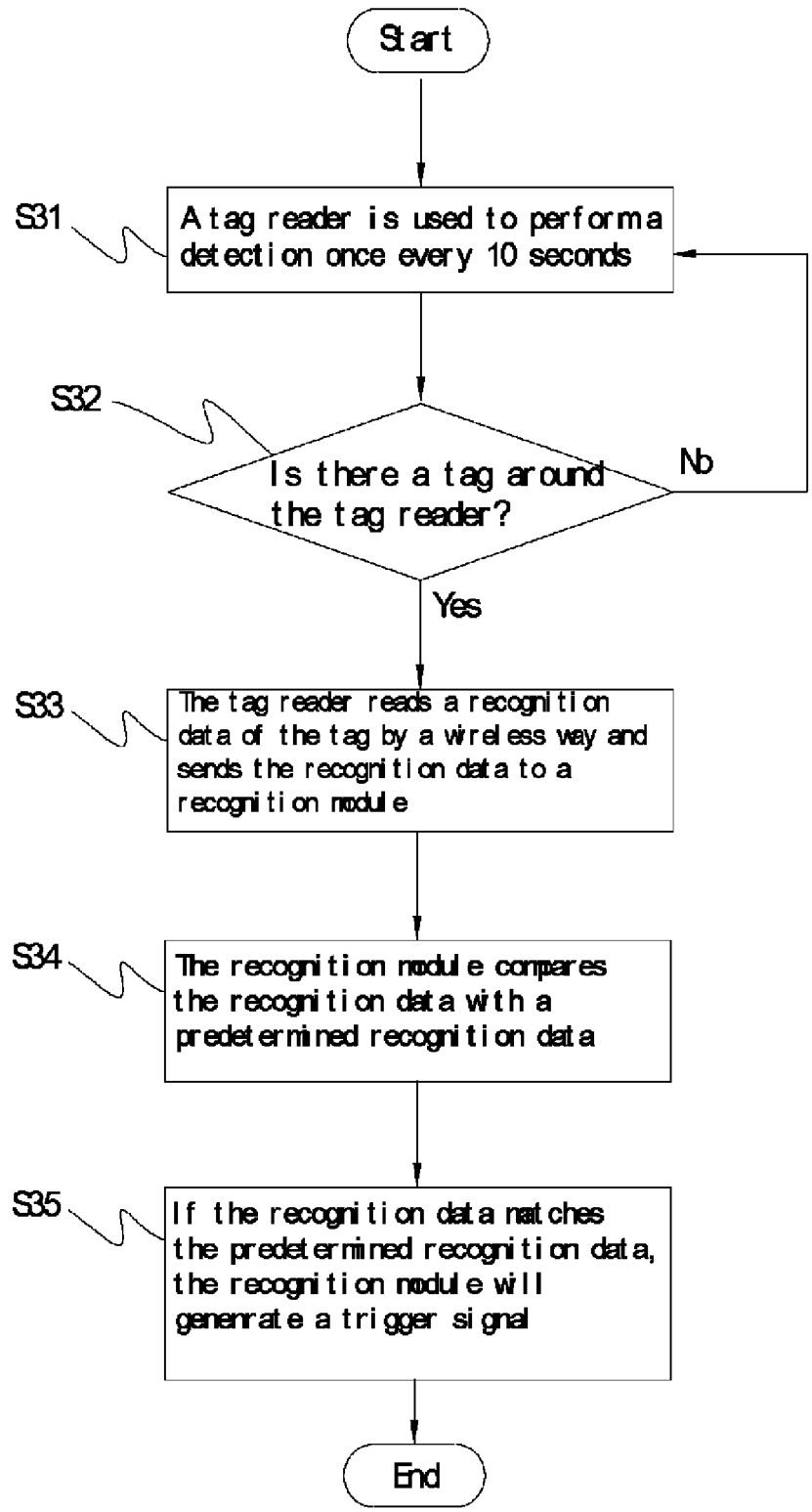
FIG. 3 is a flow chart of detecting and reading a tag according to a preferred embodiment of the present invention.

Referring to FIG. 3 for the flow chart of detecting a tag according to a preferred embodiment of the present invention, the flow chart comprises the steps of: using a tag reader to perform a detection once every 10 seconds (S31); confirming whether or not there is a tag around the tag reader (S32); if yes, then the tag reader will read a recognition data of the tag by a wireless way and send the recognition data to a recognition module (S33); comparing the recognition data with a predetermined recognition data by the recognition module (S34); if the recognition data matches the predetermined recognition data, the recognition module will generate a trigger signal (S35); and ending the whole flow chart. In addition, a frequency of 13.56 KHz is usually used for carrying out the signal transmissions. If the distance between the tag and the reader is less than 1 meter, the recognition percentage is over 90%.

Figure 4:
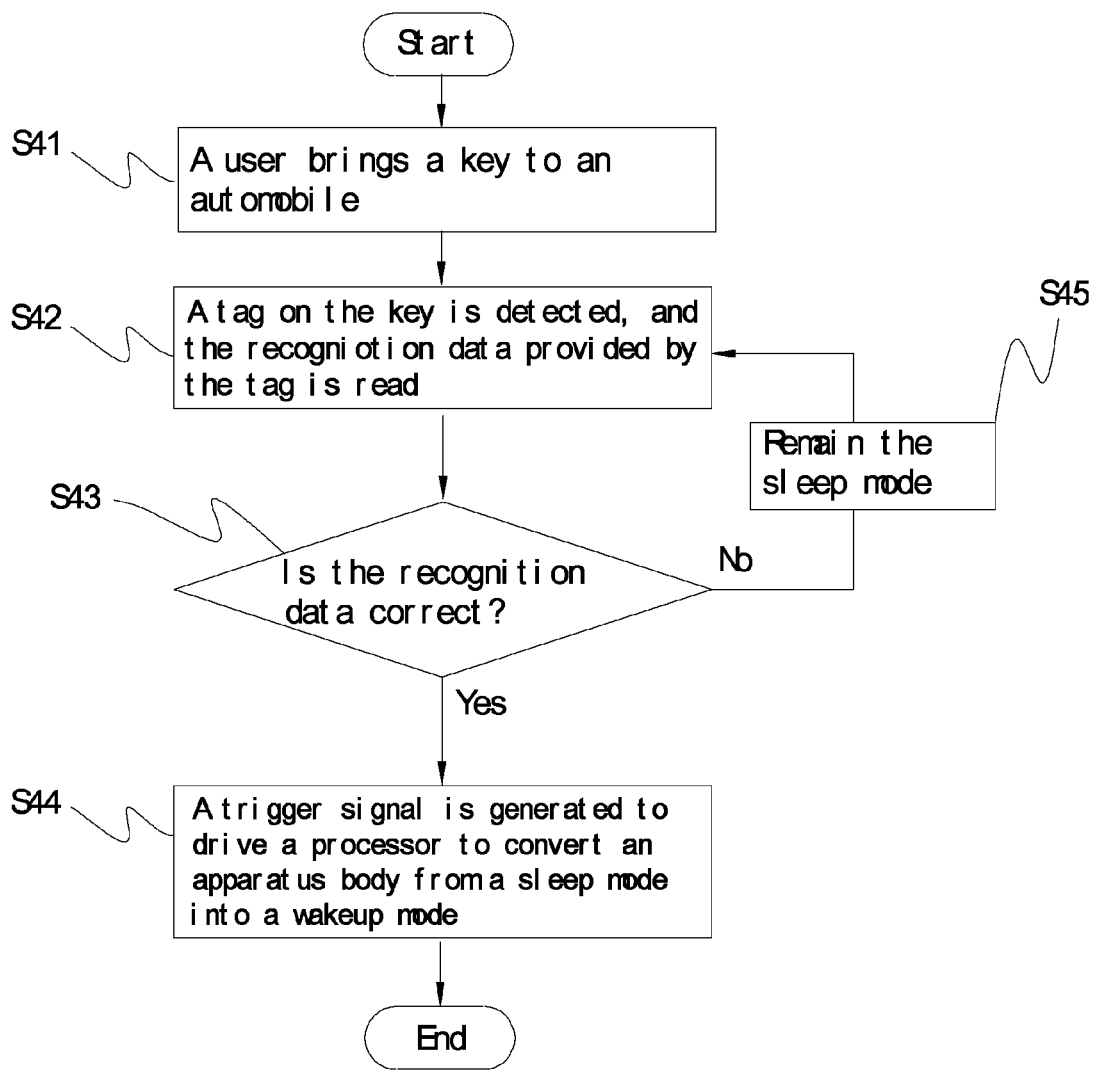
FIG. 4 is a flow chart of executing a boot up procedure of a control system according to a preferred embodiment of the present invention.

Referring to FIG. 4 for the flow chart of executing a boot up process of a control system according to a preferred embodiment of the present invention, an apparatus body is at a sleep mode, and a tag is installed in a key The boot up process comprises the steps of: starting the process; bringing a key to an automobile by a user (S41); detecting the tag of the key by a tag reader and reading a recognition data provided by the tag (S42); determining whether or not the recognition data is correct by a recognition module (S43); if yes, then a trigger signal will be generated to drive a processor to convert the apparatus body from the sleep mode into a wakeup mode for performing a navigation function (S44); if no, then the sleep mode will remain, and the reader will read the next record of recognition data (S45); and finally ending the whole process. With this process, the apparatus body can achieve the automatic booting effect.

Figure 5:
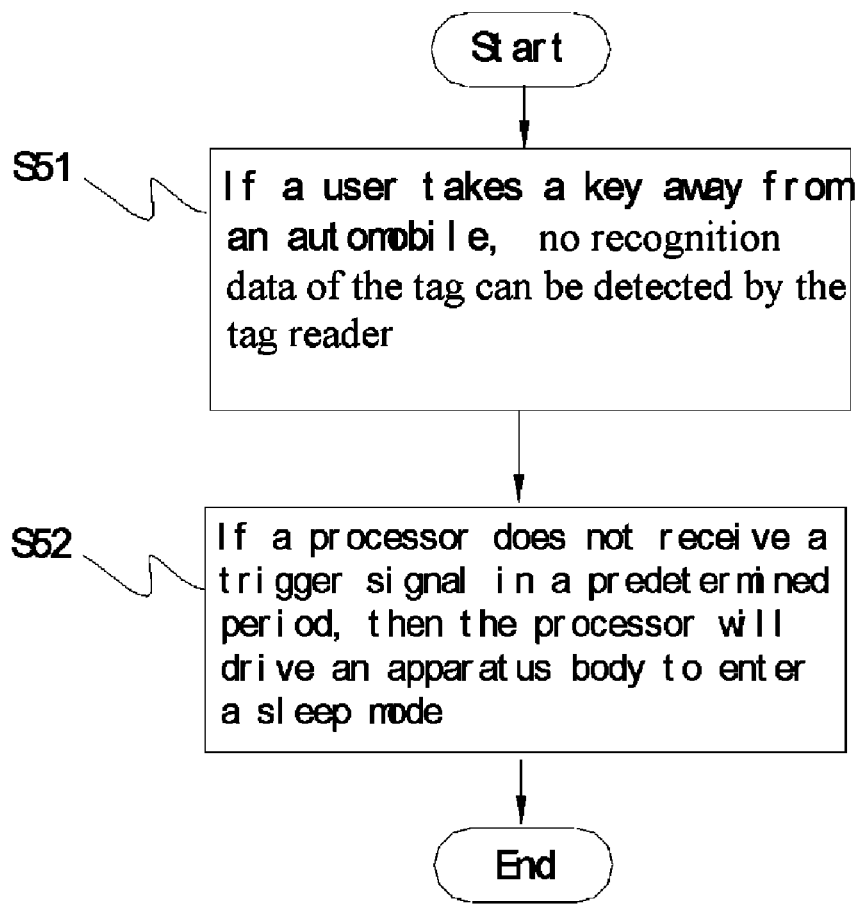
FIG. 5 is a flow chart of executing a shut down procedure of a control system according to a preferred embodiment of the present invention.

Referring to FIG. 5 for the flow chart of executing a shut down process of a control system according to a preferred embodiment of the present invention, an apparatus body is at a wakeup mode, and a tag is installed in a key. The shut down process comprises the steps of: starting the process; brining a key out from an automobile by a user, and thus no recognition data of the tag can be detected by the tag reader (S51); driving an apparatus body to be converted from a wakeup mode into a sleep mode if a processor does not receive a trigger signal in a predetermined period (S52); and ending the whole process. With this process, the apparatus body can be shut down automatically, so as to save the power consumption of the satellite navigation apparatus.

It should be noted that the object can also be a vehicle, and the tag can be attached to the vehicle. When the user takes the apparatus away from the vehicle, the situation is reversed. In other words, the apparatus body will be at the wakeup mode when placed in the car.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A control system applied to a satellite navigation apparatus, comprising:
   an apparatus body installed in said satellite navigation apparatus for providing a navigation function;
   a radio frequency identification (RFID) tag disposed on an object for providing a recognition data;
   a reader installed in said satellite navigation apparatus for detecting and reading said recognition data;
   a recognition module installed in said satellite navigation apparatus for comparing said recognition data with a predetermined recognition data; if said recognition data matches said predetermined recognition data, then said recognition module will generate a trigger signal; and
   a processor installed in said satellite navigation apparatus for receiving said trigger signal to drive said apparatus body to perform a wakeup mode; thereby, if said processor does not receive said trigger signal in a predetermined period, said processor will drive said apparatus body to enter a sleep mode.

2. The control system of claim 1, wherein said reader periodically performs a detection.

3. The control system of claim 1, wherein said reader is a radio frequency identification (RFID) reader.

4. The control system of claim 1, wherein said satellite navigation apparatus is a personal digital assistant or an automobile satellite navigation apparatus.

5. The control system of claim 1, wherein said object is a key or a remote controller.

6. The control system of claim 1, wherein said object is a vehicle.

7. The control system of claim 1, wherein said recognition data is a radio frequency identification (RFID) code.

8. The control system of claim 1, wherein said predetermined recognition data is a radio frequency identification (RFID) code.

9. The control system of claim 1, wherein a light module, a sound module, or a GPS module is turned off under said sleep mode.

10. The control system of claim 1, wherein a light module or a sound module is turned on under said wakeup mode.

11. The control system of claim 1, wherein a GPS module is turned on under said wakeup mode on to perform a satellite positioning or execute a navigation function.

12. The control system of claim 1, further comprising a timing module for providing a timing function.

13. The control system of claim 1, wherein said predetermined period falls into a range from 5 minutes to 10 minutes.

14. The control system of claim 1, wherein said processor is a microprocessor or a microcontroller chip.

15. A control method applied to a satellite navigation apparatus having an apparatus body and a processor, and said apparatus body providing a navigation function, and said method comprising the steps of:
   disposing a radio frequency identification (RFID) tag on an object to generate a recognition data;
   installing a reader to said satellite navigation apparatus, and said reader being provided for detecting and reading said recognition data;
   installing a recognition module to said satellite navigation apparatus, and said recognition module being provided for comparing said recognition data with a predetermined recognition data;
   if said recognition data matches said predetermined recognition data, said recognition module will generate a trigger signal and send said trigger signal to said processor; and
   if said processor receives said trigger signal, said processor will drive said apparatus body to perform a wakeup mode; and if said processor does not receive said trigger signal in a predetermined period, said processor will drive said apparatus body to enter a sleep mode.

16. The control method of claim 15, wherein said processor is a microprocessor or a microcontroller chip.

17. The control method of claim 15, wherein said reader periodically performs a detection.

18. The control method of claim 15, wherein said reader is a radio frequency identification (RFID) reader.

19. The control method of claim 15, wherein said satellite navigation apparatus is a personal digital assistant or an automobile satellite navigation apparatus.

20. The control method of claim 15, wherein said object is a key or a remote controller.

21. The control method of claim 15, wherein said object is a vehicle.

22. The control method of claim 15, wherein said recognition data is a radio frequency identification (RFID) code.

23. The control method of claim 15, wherein said predetermined recognition data is a radio frequency identification (RFID) code.

24. The control method of claim 15, wherein a light module, a sound module, or a GPS module is turned off under said sleep mode.

25. The control method of claim 15, wherein a light module or a sound module is turned on under said wakeup mode.

26. The control method of claim 15, wherein a GPS module is turned on under said wakeup mode to perform a satellite positioning and execute a navigation function.

27. The control method of claim 15, further comprising a timing module installed onto said satellite navigation apparatus for providing a timing function.

28. The control method of claim 15, wherein said predetermined period falls into a range from 5 minutes to 10 minutes.

* * * * *